United States Patent [19]

Ohkoshi et al.

[11] Patent Number: 4,511,093
[45] Date of Patent: Apr. 16, 1985

[54] MIXER-GRANULATOR DRIER

[75] Inventors: Tatsuo Ohkoshi; Chikara Kobayashi, both of Tokyo, Japan

[73] Assignee: Nara Machinery Co., Ltd., Tokyo, Japan

[21] Appl. No.: 603,468

[22] Filed: Apr. 24, 1984

Related U.S. Application Data

[63] Continuation of Ser. No. 347,669, Feb. 10, 1982, abandoned.

[30] Foreign Application Priority Data

Jun. 23, 1981 [JP] Japan .................................. 56-97004

[51] Int. Cl.³ ............................................. B02C 23/20
[52] U.S. Cl. ..................................... 241/60; 241/65; 241/101 B; 241/282.1
[58] Field of Search ...................... 241/65, 60, 62, 277, 241/282.1, 61, 97, 80, 101 D, 101 B, 227, 252; 34/57 D, 181

[56] References Cited

U.S. PATENT DOCUMENTS 3,889,388  6/1975  Oguri et al. ........................ 34/57 D
4,325,515  4/1982  Herfeld .............................. 241/60 X Primary Examiner—Mark Rosenbaum
Assistant Examiner—Joseph M. Gorski
Attorney, Agent, or Firm—Michael F. Petock

[57] ABSTRACT

A mixer-granulator drier comprises a mixer-granulator having main and auxiliary mixing-granulating blades mounted in a vessel forming the main body so that both the blades are revolved to accomplish mixing and granulation of powders as desired. The bottom plate of the vessel is formed with a number of slots, a valve mechanism for opening and closing the slots are located adjacent the slots, and a drying-air supply device is provided for supplying the vessel with drying air through the slots. This combination apparatus performs mixing, granulation, and drying of various drugs, foods, chemicals, etc., in a single vessel automatically and continuously. The apparatus is easy to disassemble for thorough cleaning and sterilization.

5 Claims, 8 Drawing Figures

MIXER-GRANULATOR DRIER

This is a continuation of application Ser. No. 347,669, filed Feb. 10, 1982 by the inventors herein and entitled "MIXER-GRANULATOR DRIER" now abandoned.

This invention relates to a combination mixer, granulator, and drier capable of performing all unit operations of mixing (dispersing), granulating, and drying powders for various drugs, foods, chemicals, etc. by a single apparatus.

Heretofore, for example, in the preparation of fine grains (granules) as pretreated material for tablets of drugs, it has been customary to use a set of single-purpose machines, such as a mixer, a (wet) granulator, and a drier, or employ at most a mixer-granulator combination together with a drier. Gathering of such single-purpose units presents many difficulties. The more the number of such units installed in the production line, the more frequent the necessity of material handling, including the discharge, transfer, feed, and delivery of material powders or granules from unit to unit, will be. Accordingly, the equipment will be more complex, requiring more labor, with increased possibilities of powder scattering, ingress of impurities, and contamination with bacteria from the atmosphere, which can be serious problems especially in the production of pharmaceuticals and foods.

The present invention has been perfected with the view to overcoming the foregoing difficulties, and it is an object of the present invention to provide a mixer-granulator drier which can perform mixing, granulation, and drying of various materials for drugs, foods, chemicals, etc., automatically and continuously in a single vessel.

Another object of the invention is to provide a mixer-granulator drier which can be simply disassembled into components for perfect cleaning and sterilization and which conforms to the Good Manufacturing Practices (GMP).

The invention will be better understood from the following detailed description when taken in conjunction with the accompanying drawings, wherein.

Figure 4A:
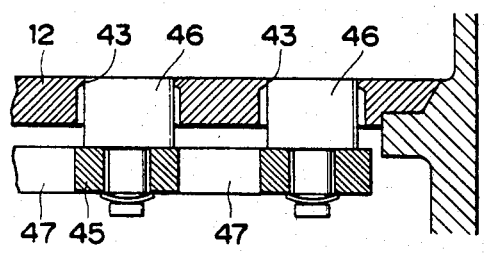
Figure 5A:
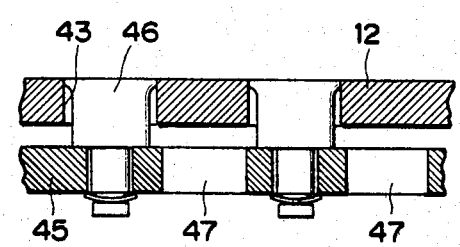
Figure 4B:
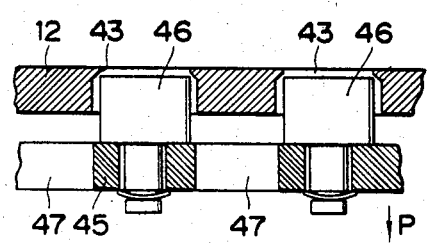
Figure 5B:
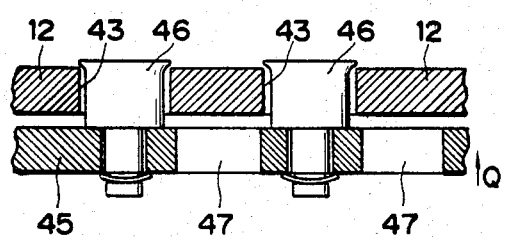
Figure 6:
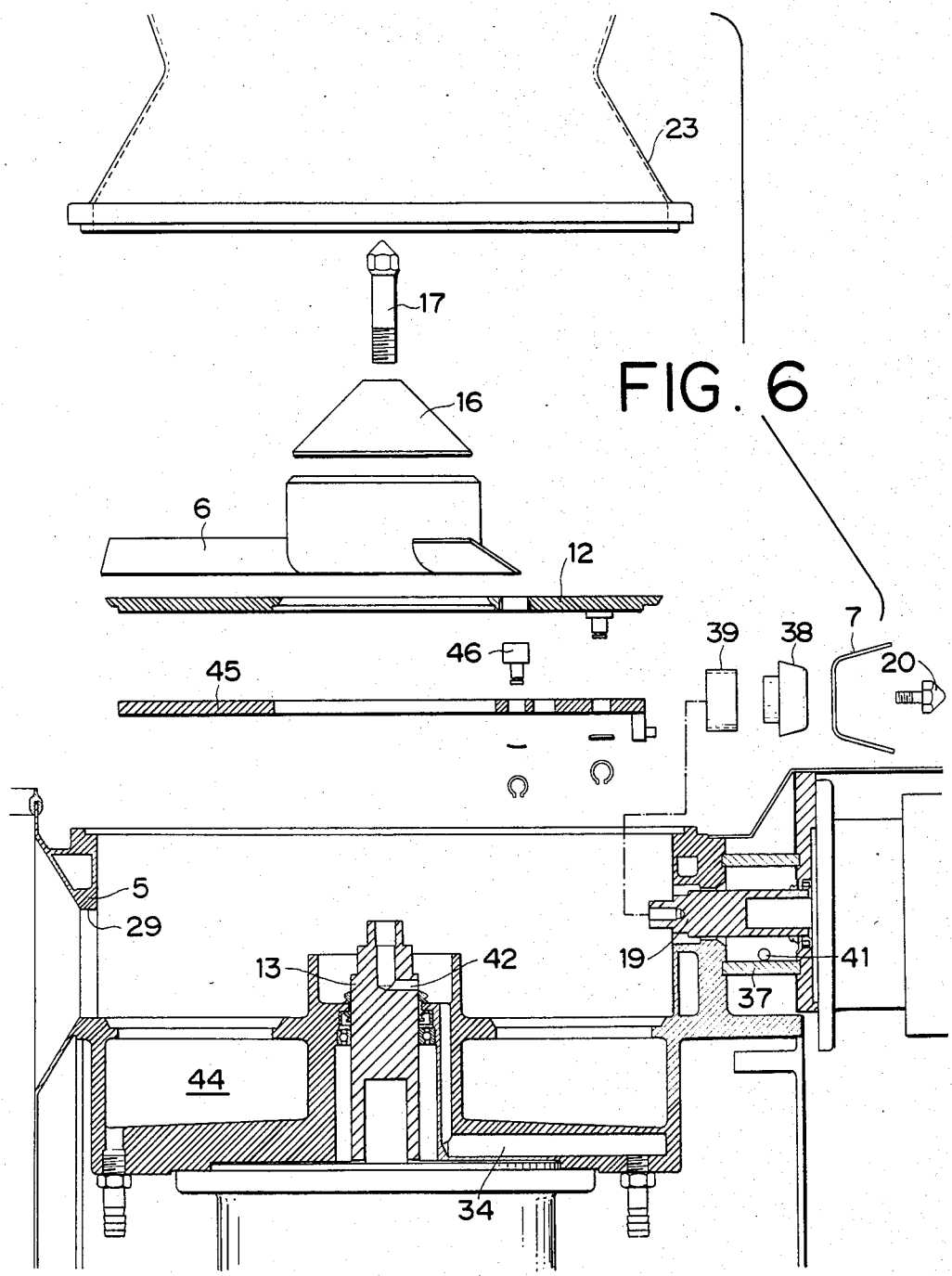

FIGS. 4(a) and 4(b) are fragmentary sectional views, on an enlarged scale, of the bottom plate and movable pieces in different relative positions;

FIGS. 5(a) and 5(b) are views similar to FIGS. 4(a) and 4(b), respectively, but showing those of another embodiment; and FIG. 6 is an exploded view of the essential parts of the mixer-granulator drier according to the invention.

Figure 1:
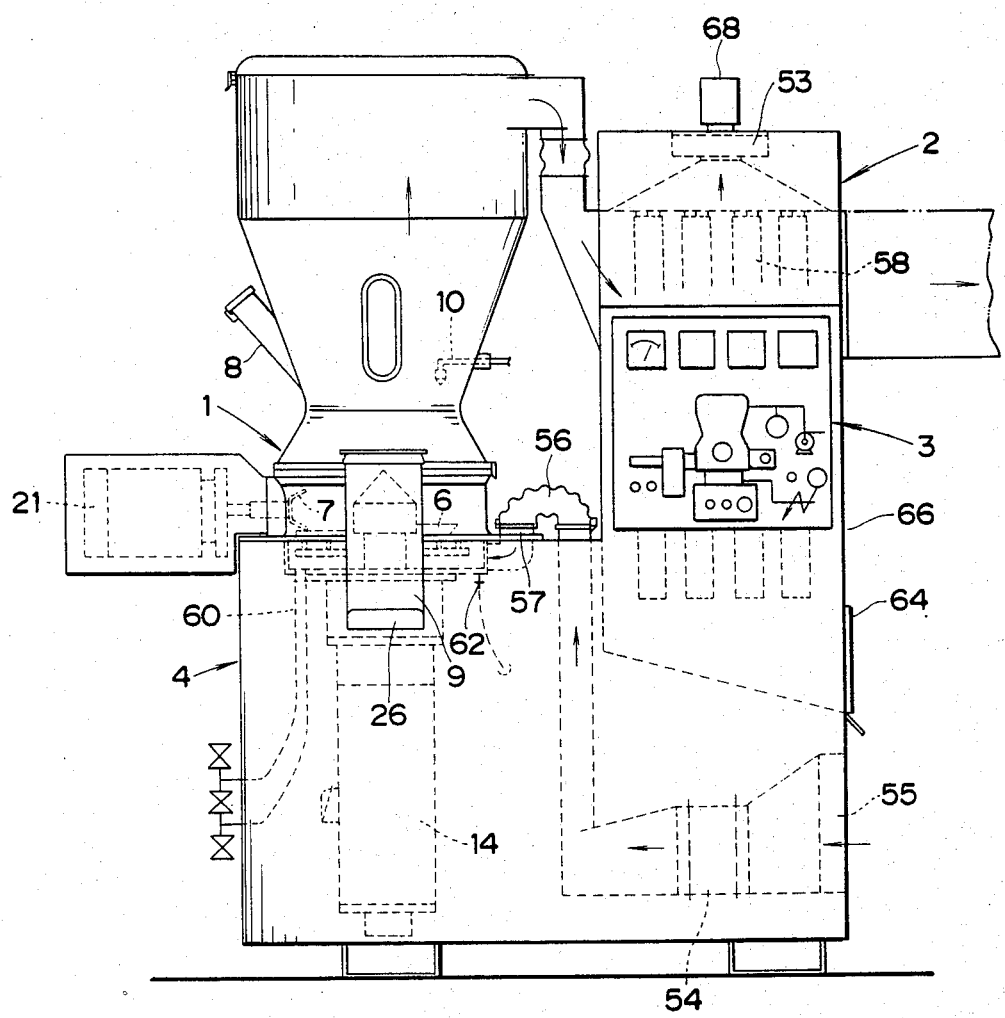
FIG. 1 is a general schematic view of a mixer-granulator drier embodying the invention.

Referring now to FIG. 1, an apparatus according to the invention for mixing, granulating, and drying is shown comprising a machine body 1, a powder collector 2, a control panel 3, and their bed 4.

Figure 2:
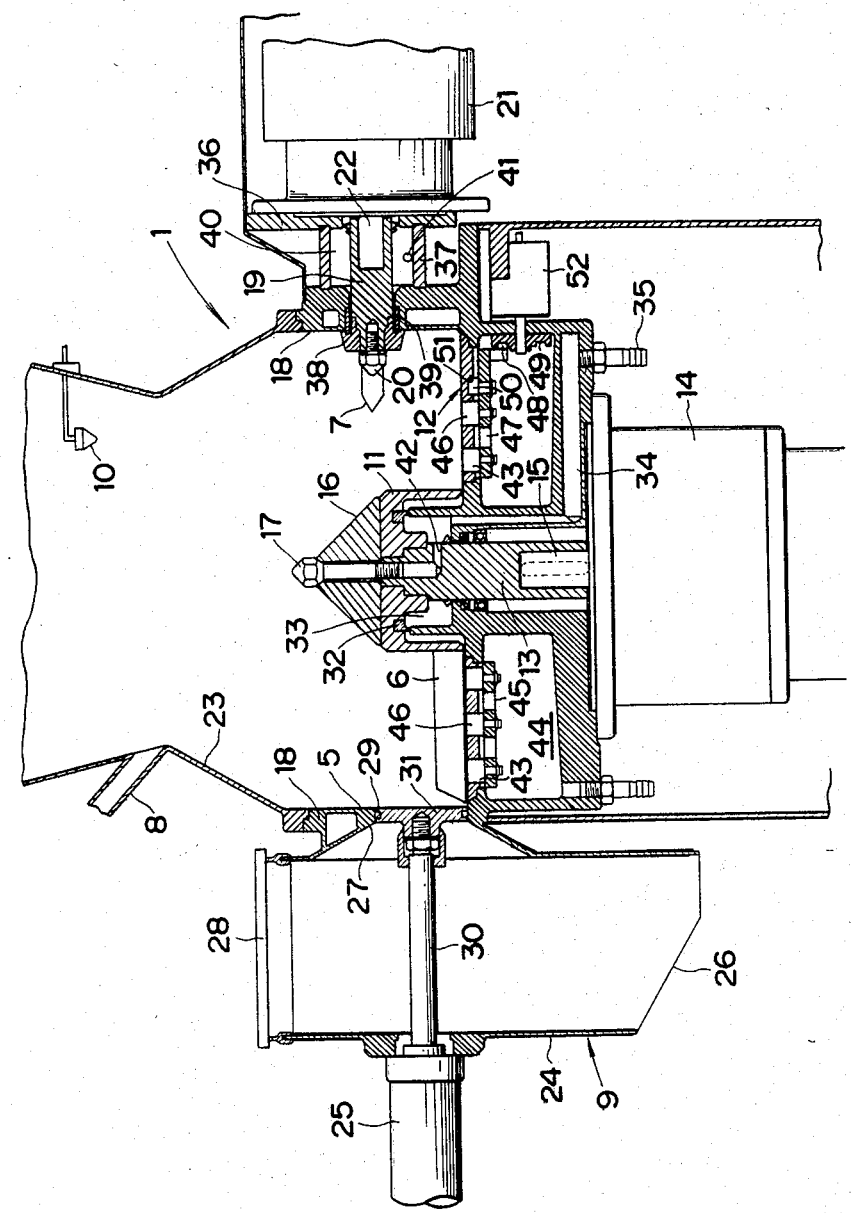
FIG. 2 is a partly sectional vertical elevation of the essential parts of the main body, taken along the lines X—O—X and Y—Y of FIG. 3.
Figure 3:
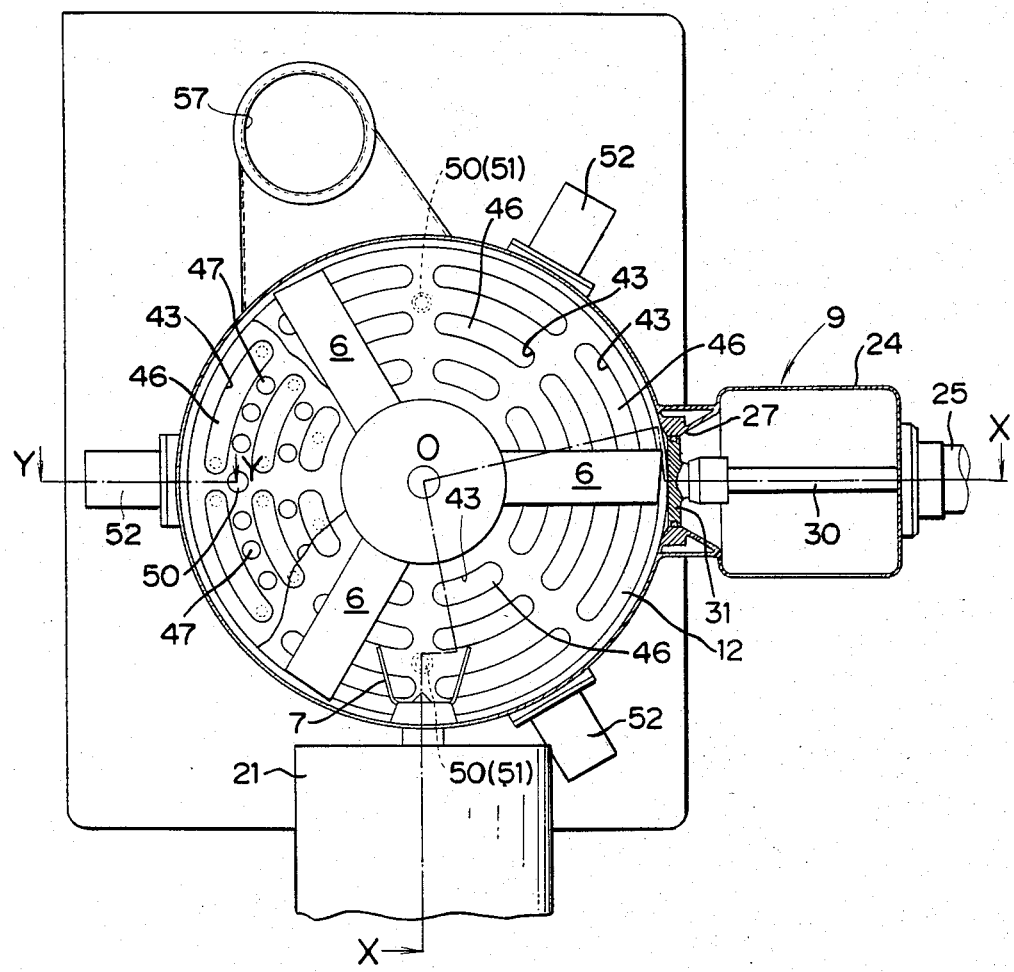
FIG. 3 is a plan view of the essential parts in FIG. 2.

The machine body 1, as shown in FIGS. 2 and 3, includes a vessel 5, main mixing-granulating impeller blades 6, auxiliary mixing-granulating blades 7, a material powder feed inlet 8, a product discharger 9, and a granulating-binder supply nozzle 10.

The main blades 6 are supported by a center boss 11 which is fitted on and engaged with one end of a coupling rod 13 which, in turn, extends upward through a center opening of a bottom plate 12 of the vessel 5. The other end of the rod 13 is fixedly mounted on the shaft 15 of a drier motor 14. Thus, the main blades 6 are adapted to revolve along a plane parallel to the bottom surface of the vessel 5. Indicated at 16 is a conically-shaped spacer for the main blades, through which the blades 6 are fastened to the coupling rod 13 by a bolt 17.

The auxiliary blades 7 are fastened, by a bolt 20, to one end of a coupling rod 19 projecting inwardly from the side wall 18 of the vessel 5. The other end of the rod 19 is secured to the shaft 22 of a drive motor 21, so that the auxiliary blades can turn on a plane substantially parallel to the side wall of the vessel 5. The auxiliary mixing granulating blades 7 are mounted just above the proximity or proximity points of the ends of the main rotary mixing granulating blades 6 on the internal lateral surface of sidewalls 18 as shown in FIG. 2.

The material powder feed inlet 8 and the granulating-binder supply nozzle 10 are both disposed through the wall of an upper casing 23 of the vessel 5. The upper casing has a cross section constricted midway and then flared upwardly, and, near the upper end, it is communicated with a powder collector 2.

The product discharger 9 includes a container 24 and a power cylinder 25 for driving the discharge mechanism. The container 24 is a hollow cylindrical form having a discharge outlet 26 at the lower end and an inlet 27 on one side, with the upper end closed by a cap 28. The container 24 is attached to the vessel 5 of the main body, with the inlet 27 in register with the outlet 29 formed in the side wall 18 of the vessel 5. The cylinder 25 has a piston rod 30 carrying a valve body 31 at the free end, so that the endwise reciprocation of the rod 30 can close or open the inlet 27 with the valve body 31.

In this embodiment a seal 32 is interposed between the boss 11 of the main blades 6 and the vessel 5 of the main body to provide a chamber 33 between the two. The chamber, in turn, communicates through a passage 34 with a nozzle 35 installed in the lower part of the vessel 5 for supplying compressed air for shaft sealing. Similarly, with the auxiliary baldes 7, too, a ring 37 is fitted between the outer surface of the vessel 5 and a mounting flange 36 of the drive motor 21, and a seal 39 is interposed between the vessel 5 and a spacer 38 between the auxiliary blades 7 and the coupling rod 19 so as to form a chamber 40. Like the chamber 33 associated with the main blades 6, this chamber is connected to a nozzle (not shown) through a passage 41.

In FIG. 1 the reference numeral 60 designates a wash water drain pipe which also serves as a compressed air inlet pipe for shaft sealing for the main blades 6, and 62 is a drain hole for wash water, 64 a fine powder outlet, 66 a bag filter chamber, and 68 a drive motor for a fan 53. In FIG. 2, the numeral 42 indicates a drain passage formed in a coupling rod 13.

In accordance with the invention, the mixer-granulator combination of the construction described above further incorporates a drying mechanism. A number of slots 43 are formed in the bottom plate 12 of the vessel 5. Valve means to open and close the slots 43 are provided, and a chamber 44 is formed below the bottom plate 12 to introduce a fluid through the slots 43 into the vessel 5.

The valve means comprises a movable disk vertically movably held under the bottom plate 12 of the vessel 5 and movable valve pieces 46 held on the upper surface of the disk, as shown on an enlarged scale in FIG. 4 or 5, each piece being adapted to be fitted in the associated one of the slots 43 of the bottom plate to establish practically hermetic seal. The movable disk 45 has holes 47 drilled through suitable portions. Also, as shown in FIG. 2, a roller 48 is held on the lower periphery of the disk 45 and is engaged with an eccentric cam 49 provided inside of the chamber 44. Further, the movable disk 45 has guide pins 50 set upright in engagement with guide holes 51 formed on the under side of the bottom plate 12 of the vessel 5.

The valve means is used when drying granules in the vessel 5. In the embodiment being described, a conduit 57 (FIG. 1) is attached to the outside of the vessel 5 and is open to the chamber 44 so as to introduce air for drying use.

The operation of the embodiment will be explained below, with clarification of further details of the construction.

First, material powders for forming desired granules (fine grains) (e.g., a principal ingredient or base and a vehicle suited to the properties of the base, such as a mixture of lactose, dextrin, and methyl cellulose) are weighed to specified proportions. The mixture is charged through the material powder feed inlet 8 into the vessel 5 of the main body according to the invention. At this point the relative position of the bottom plate 12 of the vessel 5 and the movable valve pieces 46 of the movable disk 45 is as indicated in FIG. 4(a) or 5(a); they are set together so that the upper ends of the movable pieces 46 are flush with the upper surface of the bottom plate, thus preventing unwanted powder fall. The outlet 29 is kept closed by the valve body 31.

After the conclusion of material powder feeding, mixing operation is started. As soon as the main blades 6 for mixing and granulation are revolved horizontally at a high speed by the drive motor 14 (usually, at a blade peripheral speed in the range of about 6–12 m/sec), the auxiliary mixing-granulating blades 7, held at right angles to the main blade axis, are driven at a high speed by the drive motor 21 (usually, at a blade peripheral speed of about 6–24 m/sec). The material powders are vigorously turned horizontally in the vessel with the revolution of the main blades 6 while, at the same time, being forced centrifugally toward the surrounding wall of the vessel 5. The charge is gradually forced upwardly to the constriction of the upper casing 23 (the surrounding wall of the constriction being inwardly inclined suitably at an angle of 45–75° to the horizontal) and then is returned rapidly to the eye of the main blades 6. As this cycle is repeated, the powdery mixture is subjected to a combination of convection and shearing (dispersing) action in a so-called rope-making or twisting motion inside the vessel 5 and the upper casing 23. In addition, the auxiliary blades 7 locally exert high-speed shearing and mixing actions. All these actions combined, the apparatus concludes intimate mixing (dispersion) of the powders within a very short period of time (usually, in 2–5 minutes).

Immediately following the conclusion of mixing, the operation shifts to granulation. The main blades 6 are set to a low speed suitable for granulation of the material powders (usually, in terms of the peripheral speed of the blades, in the range of about 2–12 m/sec). The auxiliary blades 7, on the other hand, are set to a high speed (usually, 6–24 m/sec). A binder (generally water, starch paste, anhydrous dextrose, solution, etc.) compatible with the main ingredient and the vehicle is supplied by a fixed delivery pump or the like (not shown) onto a suitable upper portion of the powder layer in an agitated and mixed state, through the granulating-binder supply nozzle 10. The kind, concentration, quantity, etc. of the binder are so chosen as not to affect unfavorably the properties of the main ingredient and the vehicle.

The material powders (the main ingredient and the vehicle) having been supplied with the binder, the viscosity and binding force inherent to the binder combine with the mixing and dispersing actions of the main blades 6 to aid agglomeration of the particles into larger grains. The resulting agglomerates of grains are reduced to particles of a proper size by the breaking action of the auxiliary blades 7 running at a high speed. In other words, the main blades 6 serve primarily to cause size enlargement of particles under the binding action of the binder, while the auxiliary blades 7 mainly act to break and reduce the agglomerates formed in the course of granulation into particles of a desired size. The process of granulation usually comes to an end in about 3–15 minutes, although the length of time varies with the kinds of the material powders and the binder.

In the course of mixing-granulation so far described, the speeds and lengths of running time of the main and auxiliary blades 6, 7, the quantity and period of binder supply, and others, including their starts and stops, are all controlled automatically and continuously by instrumentation, including timing, sequence, and rotation controls, in a control panel 3. From the point where the mixing-granulation has been concluded, the operation proceeds automatically and uninterruptedly to drying of the granules.

Under sequence control, the cams 49 are first driven by (usually three) torque actuators 52 to move the movable disk 45 up or down to bring the movable valve pieces 46 to the points where they open flow passages in the bottom plate 12 for hot air as shown in FIG. 4(b) or FIG. 5(b).

With the arrangement shown in FIG. 4(b), the movable disk 45 is lowered in the direction of the arrow P, and with the arrangement in FIG. 5(b), the disk is raised in the direction Q. This admits jets of drying hot air from the chamber 44 below the vessel 5 upwardly into the vessel through the holes 47 and the slots 43. At the same time, the fan 53 of the powder collector 2 (FIG. 1) is started by the drive motor 68, and a solenoid-operated valve (not shown) is opened to supply a heating medium to an air heater 54 (FIG. 1) housed in the bed 4. As the fan 53 draws by suction, air form the outside is led through a drying-air filter 55, and clean air is heated to a predetermined temperature by the air heater 54 (usually, an aerofin heater which depends on steam for heat supply or a sheathed heater for electric heating). The hot air is conducted through a detachable hot air duct (flexible coupling) 56 and the hot air inlet 57 into the chamber 44 below the vessel 5. The hot air is then forced through the holes 47 and the slots 43 into the vessel 5, where it dries the wet-granulated material in a fluidized state. During the drying operation, the auxiliary blades 7 are kept stationary but the main blades 6 are intermittently driven at a very low speed (usually, 4–10 rpm) because the main blades stopped in given positions can obstruct the issuance of dry hot air in the particular regions. The intermittent operation, of course, is automatically and continuously controlled under sequence control at the control panel 3.

Flowing upwardly through the fluidized bed, the moistened air reaches the upper flared part of the upper casing 23 of the vessel 5, where the material it carries is classified into the granulated product (granules) and some fine powder contained among the granules. Coarse granules are dropped back to the fluidized bed, while fines are carried by the air into the bag filter chamber 66, where the fine powder is recovered by bags of fine filter cloth 59. The clean air, freed from the powder, is released out of the system by the suction fan 53. The drying time, which depends largely on the hot air temperature permissible for drying purpose, is usually in the range of about 30–100 minutes.

Simultaneously with the conclusion of drying, the fan 53 is stopped, the steam valve is closed, and the bottom plate 12 of the vessel 5 and the movable valve pieces 46 are brought back to the original relative positions shown in FIG. 4(a) or FIG. 5(a) (i.e., where the upper surfaces of the movable pieces are flush with that of the bottom plate), all under preset timer control. Next, the valve body 31 is moved to open the outlet 29 of the vessel and, at the same time, the main impeller blades 6 are driven to discharge the total quantity of dry granules within a very short period of time (usually, about 30 seconds) through the outlet 29. The series of mixing, granulating, and drying operations is now over. From then on, the cycle is repeated for each batch of material so that the three different operations of mixing, granulation, and drying can be performed in a single vessel without transferring (handling) the powdery material from unit to unit.

In the embodiment being described, a small amount of clean compressed air (usually, at a pressure of 0.3–3 kg/cm$^2$) is continuously supplied from the nozzle 35 provided at the bottom of the vessel 5 to the chamber 33 through the passage 34 during the series of mixing, granulating, and drying operations. Since the compressed air continues to issue past the seal 32 for the main blades 6 into the vessel 5 which is on the lower pressure side, there is no possibility of the particles leaking to the shaft side. Similar construction is adopted for the shaft sealing for the auxiliary blades 7. Those passages 34, 41 for supplying compressed air also serve as drains at the time of washing with water. Although the movable pieces 46 are arcuate- or oval-shaped in varied sizes and arranged in a concentric circular pattern in the embodiment described above, it is possible according to the size of the vessel and the kinds of material powders to arrange oval-shaped movable pieces of the same size radially or use round-shaped ones instead. Also, while the essential parts of the mixing-granulating-drying vessel, filter, air heater, bag filter, fan, control panel, etc. are all mounted in or on a single machine bed, they may be separately installed and then connected with removable lines and wires, where the scale of equipment justifies.

FIG. 6 is an exploded view of essential parts for washing and sterilizing the mixer-granulator drier of the present invention. As can be seen, the apparatus according to the invention can be disassembled completely with ease, and therefore it conforms to the production requirements of the GMP and has a construction and functions as a most desirable mixer-granulator drier for the production of drugs, food-stuffs, etc.

Aside from stainless steels usually used, the apparatus may be built of titanium, aluminum, etc., depending on the properties of the material powders to be handled.

As has been described hereinbefore, the apparatus according to the invention, when used in producing fine grains (granules) as pretreated material to be subsequently tableted as a drug or the like, can perform the mixing, granulating, and drying operations in a single vessel without transferring the powdery material from unit to unit. Consequently, it eliminates the danger of particle scattering, intrusion of foreign matter, or contamination with microorganisms in air during the treating operations, and can reduce the overall production time.

What is claimed is:

1. A mixer-granulator drier, comprising:
    a vessel;
    a mixing-granulating mechanism mounted in said vessel and including main and auxiliary rotary mixing granulating blades which are caused to revolve so as to accomplish mixing and granulation of powders as desired;
    said main rotary mixing granulating blades being provided at a bottom of said vessel and said auxiliary rotary mixing granulating blades being provided at an internal lateral surface of said vessel just above a proximity of ends of said main rotary mixing granulating blades;
    a valve means for opening and closing a number of slots formed in a bottom plate of said vessel, said valve means including movable pieces adapted to open and close said slots, and means for raising and lowering said movable pieces so that said valve means may be closed during mixing-granulating;
    said valve means includes each of said slots having a constriction at a top thereof and movable pieces of contour adapted to fit fluid-tightly in respective constrictions of said slots;
    said means for raising and lowering said movable pieces includes a movable disk located opposite an under surface of said bottom plate, said movable disk carrying said movable pieces fixedly thereon, and further includes means for raising and lowering said movable disk; and
    means for supplying drying-air into said vessel through said slots when said valve means is open.

2. A mixer-granulator drier in accordance with claim 1 wherein said valve means includes movable pieces of contours such that a stem of each movable piece is reduced in diameter and is provided with flared edges at a top thereof to fit fluid-tightly in each of said slots.

3. A mixer-granulator drier in accordance with claim 1 wherein said means for supplying drying air includes a chamber formed below an under surface of said bottom plate and further includes means for supplying drying air to said chamber.

4. A mixer-granulator drier in accordance with claim 1 wherein said main and auxiliary rotary mixing granulating blades are each mounted on separate rotary shafts passing through said vessel and including means for sealing between said rotary shafts and said vessel which includes means for supplying compressed air into said vessel from outside between said rotary shafts and said vessel.

5. A mixer-granulator drier in accordance with claim 1 wherein rotational speed of said main rotary mixing granulating blades and said auxiliary rotary mixing granulating blades are independently controllable.

* * * * *